(12) United States Patent
Tsyrganovich

(10) Patent No.: US 6,674,253 B2
(45) Date of Patent: Jan. 6, 2004

(54) SCAN VELOCITY MODULATION TECHNIQUE

(75) Inventor: Anatoliy V. Tsyrganovich, San Jose, CA (US)

(73) Assignee: Zilog, Inc., Campbell, CA (US)

( * ) Notice: Subject to any disclaimer, the term of this patent is extended or adjusted under 35 U.S.C. 154(b) by 45 days.

(21) Appl. No.: 10/038,091

(22) Filed: Jan. 3, 2002

(65) Prior Publication Data
US 2003/0122509 A1 Jul. 3, 2003

(51) Int. Cl.[7] .................................. G09G 1/04
(52) U.S. Cl. ................ 315/371; 315/403; 315/399; 315/370; 315/383; 348/626; 348/629
(58) Field of Search .............. 315/3, 364, 368.15, 315/368.17, 368.19, 368.23, 368.28, 370, 371, 382.1, 383, 399, 403, 397; 348/625, 626, 629

(56) References Cited

U.S. PATENT DOCUMENTS

| | | | | |
|---|---|---|---|---|
| 3,980,819 A | * | 9/1976 | Schwartz | 348/625 |
| 4,047,225 A | * | 9/1977 | Pittenger | 348/730 |
| 5,569,985 A | * | 10/1996 | Griepentrog | 315/397 |
| 5,600,381 A | * | 2/1997 | Griepentrog | 348/626 |
| 5,621,287 A | * | 4/1997 | Dossot et al. | 315/399 |
| 6,329,770 B1 | * | 12/2001 | Allender et al. | 315/383 |
| 6,340,995 B1 | * | 1/2002 | Allender et al. | 348/626 |
| 6,493,040 B1 | * | 12/2002 | Miller | 348/626 |

* cited by examiner

Primary Examiner—Haissa Philogene
(74) Attorney, Agent, or Firm—Parsons Hsue & de Runtz LLP

(57) ABSTRACT

A video signal is split into a first signal and a second signal. The first signal includes low amplitude/high frequency components of the video signal, which can be properly amplified by a video amplifier. The second signal includes high amplitude/high frequency components of the video signal, which cannot be properly amplified by the video amplifier. The first signal is combined with the video signal, amplified by the video amplifier, and used to modulate the intensity of an electron beam. The second signal is amplified by a scan velocity modulation amplifier and used to modulate the horizontal scan velocity of the electron beam.

30 Claims, 3 Drawing Sheets

SCAN VELOCITY MODULATION TECHNIQUE

BACKGROUND OF THE INVENTION

1. Field of the Invention

The present invention relates to raster display systems and, more particularly, and to an improved scan velocity modulation technique for use in a raster display system.

2. Related Art

Scan velocity modulation is a well-known technique used in raster display systems, such as televisions and computer displays. Scan velocity modulation is used to compensate for the suppression of high frequency components of a video signal by a video amplifier. By compensating for the suppression of high frequency components of a video signal by a video amplifier, the sharpness of an image displayed on a raster display system is improved.

Scan velocity modulation compensates for the suppression of high frequency components of the video signal by modulating the horizontal scan velocity of an electron beam (which generates the raster by scanning horizontal lines). When scanning light areas of the raster, the horizontal scan velocity of the electron beam is decreased. By contrast, when scanning dark areas of the raster, the horizontal scan velocity of the electron beam is increased. By decreasing and increasing the horizontal scan velocity of the electron beam in this manner, the sharpness (i.e., the dark-to-light and light-to-dark transitions) of the image on the raster display is improved.

FIG. 1 is a block diagram of a conventional raster display system 100 that uses the scan velocity modulation technique. Video amplifier 120 amplifies video signal VS thereby generating an amplified video signal S11. When amplifier 120 amplifies video signal VS, the high frequency components, and especially the high amplitude/high frequency components of video signal VS are suppressed. This is because video amplifier 120 has a more limited frequency bandwidth for high amplitudes at high frequencies. In other words, the high frequency components are suppressed because of slew rate limitations of video amplifier 120. As a result, amplified video signal S11 does not include all of the high frequency components of video signal VS.

This is undesirable since amplified video signal S11 is used to intensity modulate an electron beam generated by an electron gun 124. The intensity modulated electron beam strikes a phosphor coated screen 128 causing light to be emitted. The amount of light emitted depends on the intensity of the electron beam. Since amplified video signal S11 does not include all of the high frequency components of video signal VS, the electron beam is not modulated correctly and thus the image generated on screen 128 lacks sharpness.

The scan velocity modulation technique is known in the art to compensate for the suppression of the high frequency components of video signal VS and thus improve the sharpness of the image generated on screen 128. This is accomplished by providing video signal VS to a scan velocity modulation circuit, which includes high-pass filter 112, correction circuit 114, scan velocity modulation amplifier 122, and deflection coil 126.

High-pass filter 112 receives video signal VS, removes the low frequency components from video signal VS, and outputs signal S12, which includes the high frequency components of video signal VS. Correction circuit 114 receives signal S12 and generates a correction signal S13. Correction signal S13 is used to compensate for the suppression of the high frequency components of video signal VS by video amplifier 120. Scan velocity modulation amplifier 122 amplifies correction signal S13 and outputs an amplified correction signal S14. Amplified correction signal S14 is provided to deflection coil 126 and causes the horizontal scan velocity of the electron beam to increase or decrease based on the waveform of amplified correction signal S14.

A problem with the conventional scan velocity modulation technique described above is that amplified correction signal S14 provides compensation for the high amplitude/high frequency components of video signal VS (which are suppressed by video amplifier 120) as well as the low amplitude/high frequency components of video signal VS (which are not suppressed or are suppressed by a lesser amount by video amplifier 120). Consequently, amplified correction signal S14 typically overcompensates for the low amplitude/high frequency components of video signal VS and undercompensates for the high amplitude/high frequency components of video signal VS.

If an amplified correction signal S14 is generated such that it properly compensates for the low amplitude/high frequency components of video signal VS, then amplified correction signal S14 undercompensates for the high amplitude/high frequency components of video signal VS. On the other hand, if an amplified correction signal S14 is generated such that it properly compensates for the high amplitude/high frequency components of video signal VS, then low amplitude/high frequency components are distorted due to overcompensation.

Accordingly, what is needed is an improved scan velocity modulation technique.

SUMMARY OF THE INVENTION

The present invention provides an improved scan velocity modulation technique. According to the technique, a video signal is split into a first signal and a second signal. The first signal includes low amplitude/high frequency components of the video signal, which can be properly amplified by a video amplifier. The second signal includes high amplitude/high frequency components of the video signal, which cannot be properly amplified by the video amplifier. The first signal is combined with the video signal, amplified by the video amplifier, and used to modulate the intensity of an electron beam. The second signal is amplified by a scan velocity modulation amplifier and used to modulate the horizontal scan velocity of the electron beam. As a result, the low amplitude/high frequency components of the video signal are not overcompensated for and the high amplitude/high frequency components of the video signal are not undercompensated for.

In one embodiment of the present invention, a method for modulating a horizontal scan velocity of an electron beam is disclosed. The method includes generating a first signal that includes high amplitude/high frequency components of a video signal, but does not include low amplitude/high frequency components of the video signal, and modulating the horizontal scan velocity of the electron beam using the first signal.

In another embodiment of the present invention, a circuit is disclosed. The circuit includes a scan velocity modulation processor operable to generate a first signal that includes high amplitude/high frequency components of a video signal, but does not include low amplitude/high frequency components of a video signal, wherein the first signal is used to modulate a horizontal scan velocity of an electron beam.

In another embodiment of the present invention, a method is disclosed. The method includes receiving an input signal, and splitting the input signal into a first signal and a second signal, the first signal including low amplitude/high frequency components, but not high amplitude/high frequency components, and the second signal including high amplitude/high frequency components, but not low amplitude/high frequency components, wherein the second signal is used to modulate a horizontal scan velocity of the electron beam.

In another embodiment of the present invention, a circuit is disclosed. The circuit includes a scan velocity modulation processor coupled to receive an input signal, the scan velocity modulation processor operable to split the input signal into a first signal and a second signal, the first signal including low amplitude/high frequency components, but not including high amplitude/high frequency components, and the second signal including high amplitude/high frequency components, but not including low amplitude/high frequency components, wherein the second signal is used to modulate a horizontal scan velocity of the electron beam.

Other embodiments, aspects, and advantages of the present invention will become apparent from the following descriptions and the accompanying drawings.

BRIEF DESCRIPTION OF THE DRAWINGS

For a more complete understanding of the present invention and for further embodiments, aspects, and advantages, reference is now made to the following description taken in conjunction with the accompanying drawings, in which.

Like reference numerals are used for like and corresponding parts of the various drawings.

DETAILED DESCRIPTION OF THE INVENTION

Figure 1:
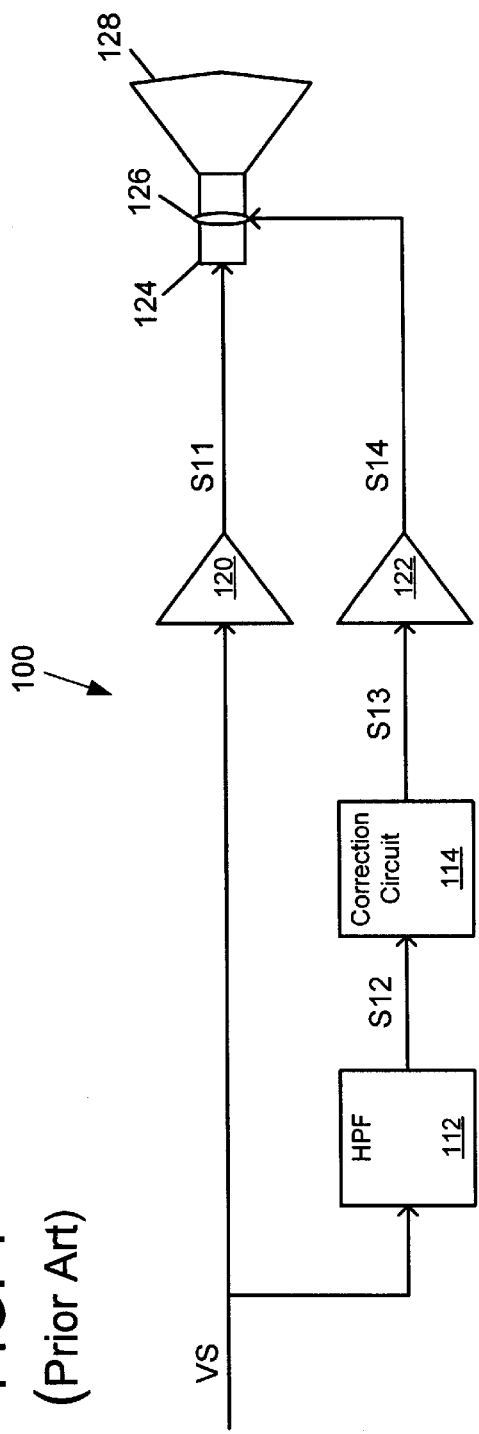
FIG. 1 is a block diagram of a conventional raster display system.
Figure 2:
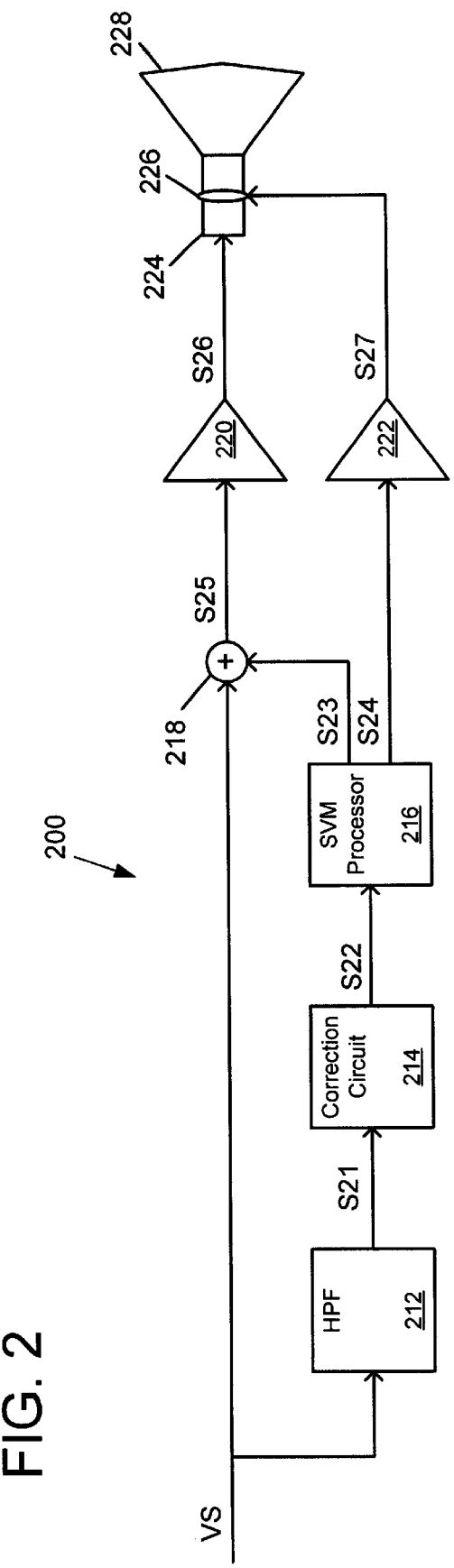
FIG. 2 is a block diagram of a raster display system, according to some embodiments of the present invention.

FIG. 2 is a block diagram of a raster display system 200, according to some embodiments of the present invention. Raster display system 200 includes a high-pass filter 212, a correction circuit 214, a scan velocity modulation processor 216, a signal combiner 218, a video amplifier 220, a scan velocity modulation amplifier 222, an electron gun 224, a deflection coil 226, and a screen 228. Those of ordinary skill in the art will recognize that one or more of the circuits within raster display system 200 (e.g., scan velocity modulation processor 216) can be implemented using hardware, firmware, software, or any combination thereof.

High-pass filter 212 is coupled to receive a video signal VS. Video signal VS includes low amplitude/low frequency components, low amplitude/high frequency components, high amplitude/low frequency components, and high amplitude/high frequency components. High-pass filter 212 removes low frequency components from video signal VS (i.e., low amplitude/low frequency components and high amplitude/low frequency components) and outputs a signal S21 that includes high frequency components of video signal VS (i.e., low amplitude/high frequency components and high amplitude/high frequency components).

Correction circuit 214 is coupled to receive signal S21 from high-pass filter 212. Correction circuit 214 uses signal S21 to generate correction signal S22. Correction signal S22 is used to compensate for the suppression of the high frequency components of video signal VS by video amplifier 220. Those of ordinary skill in the art will recognize that there are a variety of well-known correction circuits that can be used to implement correction circuit 214.

Scan velocity modulation processor 216 is coupled to receive correction signal S22 from correction circuit 214. Scan velocity modulation processor 216 processes correction signal S22 and outputs a signal S23 having low amplitude/high frequency components of correction signal S22 and a signal S24 having high amplitude/high frequency components of correction signal S22. The amplitudes and frequencies of signals S23 and S24 can be controlled by scan velocity modulation processor 216. In some embodiments, signal S24 is generated by subtracting signal S23 from correction signal S22.

Although not shown, it should be recognized that some applications will not require high-pass filter 212 and correction circuit 214. In these applications, video signal VS can be provided directly to scan velocity modulation processor 216 where scan velocity modulation processor 216 processes signal S21 and outputs signal S23 having low amplitude/high frequency components of signal S21 and signal S24 having high amplitude/high frequency components of signal S21. Together high-pass filter 212 and correction circuit 214 are used to provide the full desired corrections to video signal VS including aperture correction. Thus correction signal S22 may contain low frequencies that cannot be properly handled by the scan velocity modulation deflection coil 226 (i.e., the low frequencies may cause geometrical distortions to the displayed picture).

Signal combiner 218 is coupled to receive video signal VS and signal S23. Signal combiner 218 adds signal S23 to video signal VS to generate signal S25. Note that signal S23, which includes low amplitude/high frequency components of correction signal S22, can be amplified by video amplifier 220 even though video amplifier 220 has a limited frequency bandwidth. This is because signal S23 includes low amplitude/high frequency components of correction signal S22, but not high/amplitude high frequency components of correction signal S22.

Video amplifier 220 is coupled to receive signal S25 from signal combiner 218. Video amplifier 220 amplifies signal S25 to generate signal S26. Signal S26 is provided to electron gun 224 and is used to modulate the intensity of the electron beam generated by electron gun 224. Note that signal S26 does not include high amplitude/high frequency components of video signal VS. This is because video amplifier 220 has a limited frequency bandwidth and thus video amplifier 220 suppresses the high amplitude/high frequency components of video signal VS.

Scan velocity modulation amplifier 222 is coupled to receive signal S24 from scan velocity modulation processor 216. Scan velocity modulation amplifier 222 amplifies signal S24 to generate signal S27. Signal S27 is provided to deflection coil 226 and is used to modulate the horizontal scan velocity of the electron beam generated by electron gun 224. Generally, the horizontal scan velocity of the electron beam will also be modulated by a sawtooth shaped signal that is provided to a horizontal deflection coil (not shown). Note that signal S27 includes high amplitude/high frequency components of correction signal S22, but does not include low amplitude/high frequency components of correction signal S22.

The scan velocity modulation technique of the present invention overcomes the problems associated with conventional scan velocity modulation techniques since the scan velocity modulation technique of the present invention provides compensation for the high amplitude/high frequency components of video signal VS (which are suppressed by video amplifier 220), but not the low amplitude/high frequency components of video signal VS (which are not suppressed by video amplifier 220). This is accomplished by generating signal S27, which includes high amplitude/high frequency components of correction signal S22, but does not include low amplitude/low frequency components of correction signal S22. As a result, the low amplitude/high frequency components of video signal VS are not overcompensated and the high amplitude/high frequency components of video signal VS are not undercompensated as they are using conventional scan velocity modulation techniques. Thus the scan velocity modulation technique of the present invention improves the sharpness of the image generated on screen 128.

Figure 3:
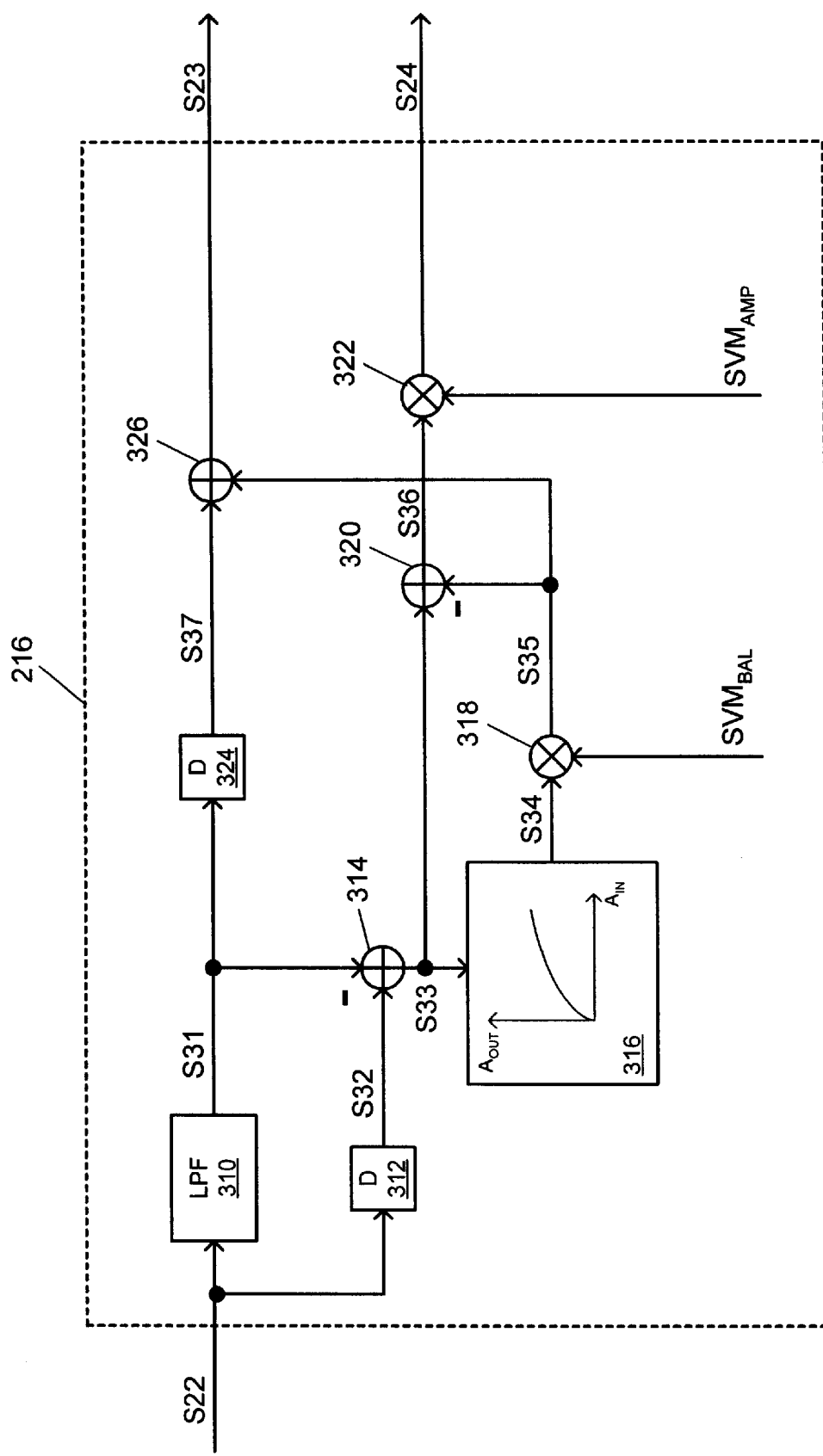
FIG. 3 is a block diagram of scan velocity modulation processor, according to some embodiments of the present invention.

FIG. 3 is a block diagram of an exemplary scan velocity modulation processor 216, according to some embodiments of the present invention. Scan velocity modulation processor 216 shown in FIG. 3 corresponds to scan velocity modulation processor 216 of FIG. 2. Scan velocity modulation processor 216 includes a low-pass filter 310, a delay element 312, a signal combiner 314, a non-linear device 316, a multiplier 318, a signal combiner 320, a multiplier 322, a delay element 324, and a signal combiner 326.

Low-pass filter 310 is coupled to receive correction signal S22. Low-pass filter 310 removes high frequency components from correction signal S22 and outputs a signal S31 that includes low frequency components of correction signal S22. Signal S31 is provided delay element 324. Delay element 324 delays signal S31 a predetermined amount of time and outputs a signal S37.

Low-pass filter 310, delay element 312, and signal combiner 314 collectively function as a high-pass filter. Delay element 312 is coupled to receive correction signal S22. Delay element 312 delays correction signal S22 a predetermined amount of time and outputs signal S32. Signal combiner 314 subtracts signal S31 (which includes low frequency components of correction signal S22) from correction signal S22 producing signal S33. Thus, signal S33 includes high frequency components of correction signal S22. Note that the cutoff frequency of high-pass filter 212 (FIG. 2) will typically be lower than the cutoff frequency of the high-pass filter formed by the combination of low-pass filter 310, delay element 312, and signal combiner 314.

Non-linear device 316 is coupled to receive signal S33. Non-linear device 316 performs a non-linear operation on the amplitude of signal S33 and outputs signal S34. Thus non-linear device 316 receives a signal (i.e., signal S33) having a high amplitude and a high frequency and generates a signal (i.e., signal S34) having a lower amplitude, but the same high frequency.

Multiplier 318 is coupled to receive signal S34 from non-linear device 316 and a scan velocity modulation balance signal $SVM_{BAL}$. Multiplier 318 multiplies signal S34 with scan velocity modulation balance signal $SVM_{BAL}$ to generate signal S35. Scan velocity modulation balance signal $SVM_{BAL}$ is used to control the amplitude of signal S34 and thus ultimately controls the balance between signals S26 and S27 (FIG. 2).

Signal combiner 320 is coupled to receive signal S33 from signal combiner 314 and signal S35 from multiplier 318. Signal combiner 320 subtracts signal S35 from signal S33 producing signal S36.

Multiplier 322 is coupled to receive signal S36 from signal combiner 320 and a scan velocity modulation amplitude signal $SVM_{AMP}$. Multiplier 322 multiplies signal S36 with scan velocity modulation amplitude signal $SVM_{AMP}$ to generate signal S24. Scan velocity modulation amplitude signal $SVM_{AMP}$ is used to control the amplitude of signal S24.

Signal combiner 326 is coupled to receive signal S37 from delay element 324 and signal S35 from multiplier 318. Signal combiner 326 adds signal S37 to signal S35 producing signal S23. Signal S37 includes low frequency components of signal S22 and signal S35 includes high frequency components of signal S36. Note that signal S35 is derived from signal S33, which has a relatively large amplitude. However, the amplitude of signal S33 is reduced by non-linear device 316. As a result, the amplitude signal S35, which includes high frequency components, is low enough such that video amplifier 220 (FIG. 2) can amplify it.

Figure 4:
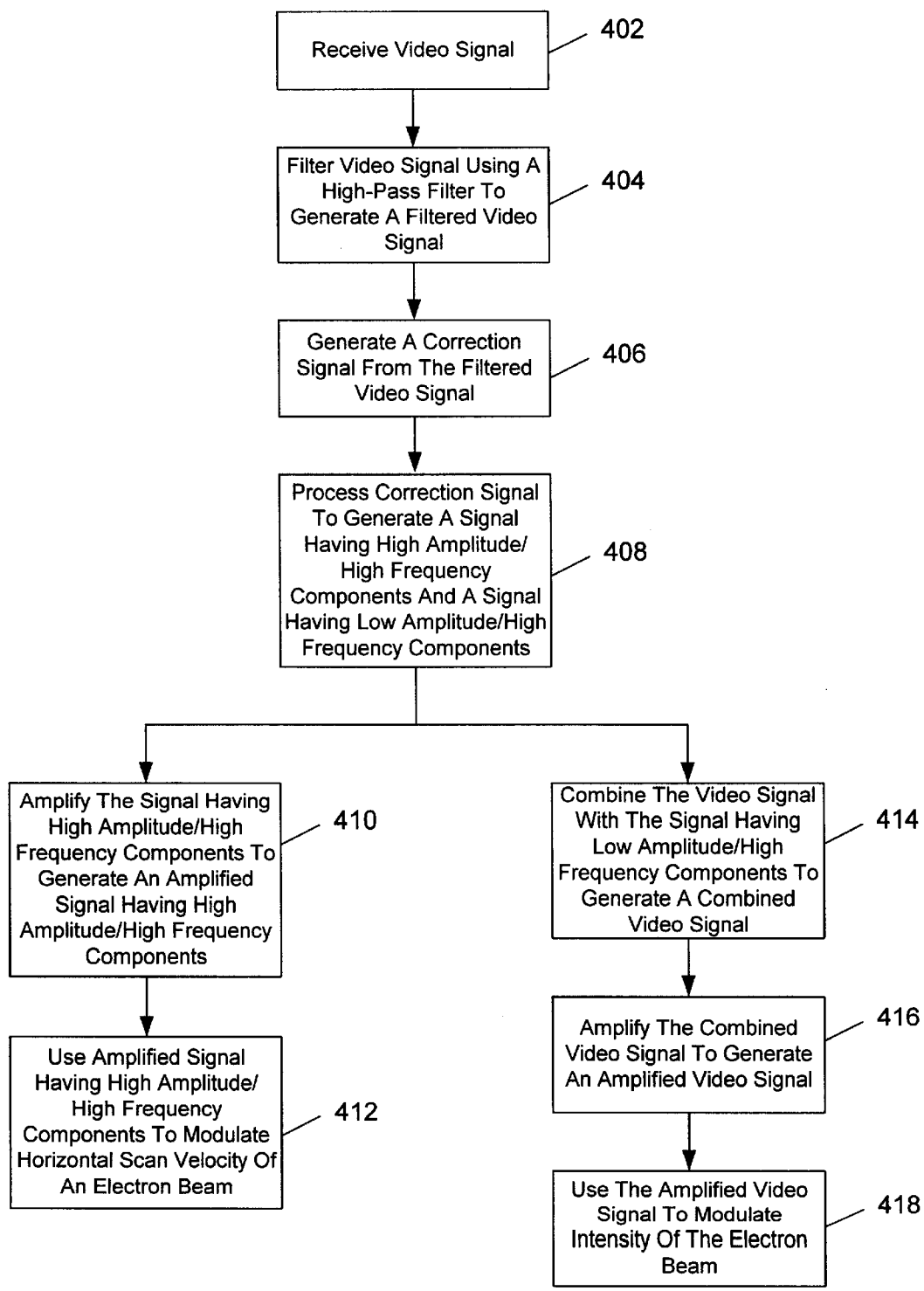
FIG. 4 is a flow chart of a method for modulating the horizontal scan velocity of an electron beam, according to some embodiments of the present invention.

FIG. 4 is a flow chart of a method 400 for modulating the horizontal scan velocity of an electron beam, according to some embodiments of the present invention. Method 400 can be performed using hardware, firmware, software or any combination thereof. Additionally, one or more of the steps of method 400 can be performed in parallel.

In step 402, a video signal is received. The video signal VS includes low amplitude/low frequency components, low amplitude/high frequency components, high amplitude/low frequency components, and high amplitude/high frequency components.

In step 404, the video signal is filtered using a high-pass filter to generate a filtered video signal. This step removes low frequency components from the video signal (i.e., both low amplitude/low frequency components and high amplitude/low frequency components of the video signal). As a result, the high-pass filtered video signal includes high frequency components of the video signal (i.e., both low amplitude/high frequency components and high amplitude/high frequency components).

In step 406, the filtered video signal is provided to a correction circuit. The correction circuit uses the filtered video signal to generate a correction signal. The correction circuit can be any type of conventional correction circuit.

In step 408, a scan velocity modulation processor processes the correction signal. The scan velocity modulation processor splits the correction signal into two signals: a signal having high amplitude/high frequency components of the correction signal and a signal having low amplitude/high frequency components of the correction signal. The scan velocity modulation processor then outputs the two signals.

It should be recognized that some applications will not require a correction circuit. In these applications, step 406 can be omitted and the filtered video signal can be provided directly to the scan velocity modulation processor.

In step 410, the signal having high amplitude/high frequency components of the correction signal is amplified to generate an amplified signal having high amplitude/high frequency components. In step 412, the amplified signal having high amplitude/high frequency components is used to modulate the horizontal scan velocity of an electron beam, for example, by providing the amplified signal to a deflection coil.

In step 414, the video signal is combined with the signal having low amplitude/high frequency components (generated in step 408) to generate a combined video signal. In step 416, the combined video signal is amplified to generate an amplified video signal. In step 418, the amplified video signal is used to modulate intensity of the electron beam, for example, by providing the amplified video signal to an electron gun.

While particular embodiments of the present invention have been shown and described, it will be apparent to those skilled in the art that changes and modifications may be made without departing from this invention in its broader aspect and therefore, the appended claims are to encompass within their scope all such changes and modifications as fall within the true spirit of this invention.

What is claimed is:

1. A method for modulating a horizontal scan velocity of an electron beam, the method comprising:

generating a first signal that includes high amplitude/high frequency components of a video signal, but does not include low amplitude/high frequency components of the video signal and does not include low frequency components of the video signal; and modulating the horizontal scan velocity of the electron beam using the first signal.

2. The method of claim 1 further comprising amplifying the first signal.

3. The method of claim 1 further comprising providing the first signal to a deflection coil.

4. The method of claim 1 further comprising:

generating a second signal that includes low amplitude/high frequency components of the video signal, but does not include high amplitude/high frequency components of the video signal; and modulating an intensity of the electron beam using the second signal.

5. The method of claim 4 further comprising combining the second signal with the video signal to generate a combined video signal.

6. The method of claim 4 further comprising:

combining the second signal with the video signal to generate a combined video signal; and amplifying the combined video signal.

7. The method of claim 4 further comprising:

combining the second signal with the video signal to generate a combined video signal;

amplifying the combined video signal to generate an amplified video signal; and providing the amplified video signal to an electron gun.

8. The method of claim 1 further comprising filtering the video signal using a high-pass filter.

9. The method of claim 1 further comprising:

filtering the video signal using a high-pass filter to generate a filtered video signal; and generating a correction signal using the filtered video signal.

10. The method of claim 1 further comprising:

generating a correction signal using the video signal;

filtering the correction signal using a high-pass filter to generate a filtered correction signal; and providing filtered correction signal to a non-linear device.

11. The method of claim 1 further comprising performing a non-linear operation on a correction signal.

12. A circuit comprising a scan velocity modulation processor operable to generate a first signal that includes high amplitude/high frequency components of a video signal, but does not include low amplitude/high frequency components of the video signal and does not include low frequency components of the video signal, wherein the first signal is used to modulate a horizontal scan velocity of an electron beam.

13. The circuit of claim 12 further comprising an amplifier coupled to receive the first signal, the amplifier operable to amplify the first signal.

14. The circuit of claim 12 further comprising a deflection coil coupled to receive the first signal, the deflection coil operable to modulate the horizontal scan velocity of the electron beam using the first signal.

15. The circuit of claim 12 wherein the scan velocity modulation processor is operable to generate a second signal that includes low amplitude/high frequency components of the video signal, but does not include high amplitude/high frequency components of the video signal.

16. The circuit of claim 15 further comprising a signal combiner coupled to receive the video signal and the second signal, the signal combiner operable to combine the video signal and the second signal.

17. The circuit of claim 15 further comprising:

a signal combiner coupled to receive the video signal and the second signal, the signal combiner operable to combine the video signal and the second signal to generate a combined video signal; and an amplifier coupled to receive the combined video signal, the amplifier operable to amplify the combined video signal.

18. The circuit of claim 15 further comprising:

a signal combiner coupled to receive the video signal and the second signal, the signal combiner operable to combine the video signal and the second signal to generate a combined video signal;

an amplifier coupled to receive the combined video signal, the amplifier operable to amplify the combined video signal to generate an amplified video signal; and an electron gun coupled to receive the amplified video signal, the electron gun operable to modulate an intensity of the electron beam using the amplified video signal.

19. The circuit of claim 12 further comprising a high-pass filter coupled to receive the video signal.

20. The circuit of claim 12 further comprising:

a high-pass filter coupled to receive the video signal, the high-pass filter operable to filter the video signal to generate a filtered video signal; and a correction circuit coupled to receive the filtered video signal, the correction circuit operable to generate a correction signal.

21. The circuit of claim 12 wherein the scan velocity modulation processor comprises:

a high-pass filter coupled to receive a correction signal, the high-pass filter operable to generate a filtered correction signal; and a non-linear device coupled to receive the filtered correction signal.

22. The circuit of claim 12 wherein the scan velocity modulation processor comprises a non-linear device coupled to receive a filtered correction signal.

23. A method comprising:

receiving an input signal; and splitting the input signal into a first signal and a second signal, the first signal including low amplitude/high frequency components, but not high amplitude/high frequency components, and the second signal including high amplitude/high frequency components, but not low amplitude/high frequency components, wherein the second signal is used to modulate a horizontal scan velocity of an electron beam.

24. The method of claim 23 wherein splitting comprises:

high-pass filtering a correction signal to generate a filtered correction signal and the first signal; and performing a non-linear operation on the filtered correction signal to generate the second signal.

25. The method of claim 23 further comprising:

combining the first signal with a video signal to generate a combined video signal;

amplifying the combined video signal to generate an amplified video signal, wherein the amplified video signal is used to modulate an intensity of an electron beam; and amplifying the second signal to generate an amplified second signal, wherein the amplified second signal is used to modulate a horizontal scan velocity of the electron beam.

26. The method of claim 25 further comprising:

providing the amplified video signal to an electron gun; and providing the amplified second signal to a deflection coil.

27. A circuit comprising:

a scan velocity modulation processor coupled to receive an input signal, the scan velocity modulation processor operable to split the input signal into a first signal and a second signal, the first signal including low amplitude/high frequency components, but not including high amplitude/high frequency components, and the second signal including high amplitude/high frequency components, but not including low amplitude/high frequency components;

wherein the second signal is used to modulate a horizontal scan velocity of an electron beam.

28. The circuit of claim 27 further comprising a correction circuit coupled to the scan velocity modulation processor, the correction circuit operable to generate a correction signal.

29. The circuit of claim 27 further comprising a signal combiner coupled to receive the first signal and a video signal, the signal combiner operable to combine the first signal and the video signal to generate a combined video signal, wherein the combined video signal is used to modulate the intensity of the electron beam.

30. The circuit of claim 27 wherein the scan velocity modulation processor comprises:

a high-pass filter; and a non-linear device having an input coupled to an output of the high-pass filter.

* * * * *